Aug. 15, 1944.  E. M. ARDELT  2,355,694
AIR SPEED METER
Filed July 10, 1943
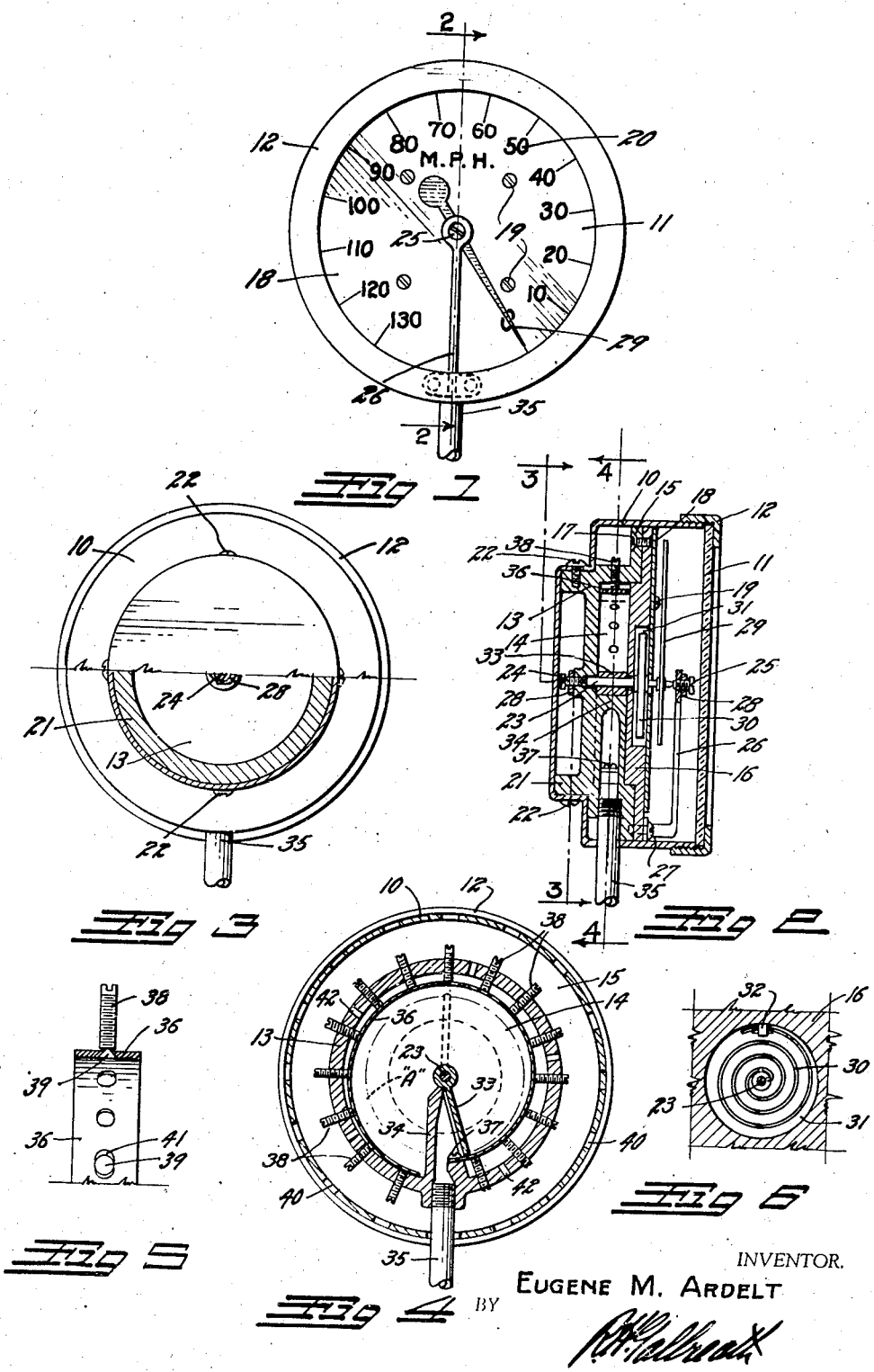
INVENTOR.
EUGENE M. ARDELT
BY Patented Aug. 15, 1944

2,355,694

UNITED STATES PATENT OFFICE 2,355,694

AIR-SPEED METER

Eugene M. Ardelt, Denver, Colo.

Application July 10, 1943, Serial No. 494,444

4 Claims. (Cl. 73—228)

This invention relates to an air speed indicator for aircraft, and it is designed more particularly as an improvement over the air speed indicator illustrated and described in applicant's Patent No. 2,296,973, issued Sept. 29, 1942.

The principal object of the invention is to provide a simple and highly efficient construction which can be accurately and individually regulated to give an accurate reading at all air speeds, and which will operate on relatively lower air speeds than the present air speed indicators.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a face view of the improved air speed indicator;

Fig. 2 is a vertical section therethrough, taken on the line 2—2, Fig. 1;

Fig. 3 is a combined rear view and section taken on the line 3—3, Fig. 2;

Fig. 4 is a cross section taken on the line 4—4, Fig. 2;

Fig. 5 is an enlarged detail view illustrating the attachment of the variable chamber wall to its adjusting screws; and Fig. 6 is a fragmentary detail view of the counterbalance spring employed in the improved air speed indicator.

The entire device is enclosed within a cup-like housing 10, the front of which is closed by a circular cover glass 11 which is held in place by means of an internally threaded bezel 12.

The indicator portion of the device consists of a main frame block 13, the forward face of which is counterbored to provide a circular vane chamber 14. The forward face of the frame block is flanged outwardly, as indicated at 15. A circular front plate 16 is secured against this flanged portion by means of suitable attachment screws 17. The front plate is covered by a circular index dial 18 secured thereto in any desired manner, such as by means of suitable attachment screws 19. The index dial carries a circular series of numerals 20 designating the various speeds for which the device is designed. The rear face of the frame block 10 is projected outwardly to form an annular rim 21, about which the housing 10 is secured through the medium of suitable attachment screws 22.

An indicator shaft 23 passes axially through the entire frame block 13. This shaft is preferably formed with pointed pivot extremities. The inner extremity of the shaft bears against an inner bearing screw 24, and the outer extremity thereof bears against an outer bearing screw 25. The inner bearing screw is threaded into the frame 13 and the outer bearing screw is carried in a bracket arm 26, which is attached to the face plate 16 by means of suitable screws 27, or in any other desired manner. Both bearing screws are preferably provided with jam nuts 28 to maintain their adjusted position.

An indicator hand 29 is mounted on the shaft 23 in front of the dial plate 18. A counter-balance spring 30 is mounted on the shaft 23, within a spring depression 31 in the plate 16. The counter-balance spring has one extremity secured to the shaft 23, the other extremity is adjustably secured to a spring post 32 mounted on the plate 16. The spring is so mounted that the tension therein will increase successively as the hand 29 moves toward successively higher numbers on the dial plate 18.

A radial vane 33 has its hub secured to the shaft 23 within the chamber 14. Air pressure against this vane rotates the shaft against the action of the spring 30 so as to move the pointer 29. A dividing partition 34 extends inwardly from the wall of the chamber 14 to a position closely adjacent to, but not contacting, the hub of the vane 33. Air enters the chamber through an air pressure pipe 35 to one side of the partition member 34, so as to exert a rotative action on the vane 33.

It is desirable that proportionally increasing amounts of this air be allowed to escape as the vane moves around the axis of the shaft 23. This is accomplished by placing a flexible, adjustable wall member 36 around the interior of the chamber 14. The wall member 36 may be formed from a strip of resilient metal which is secured to the frame 13 adjacent the inlet side of the partition 34 in any desired manner, such as by means of attachment screws 37.

Throughout its length, the wall member 36 is mounted on the extremities of a plurality of radially positioned adjusting screws 38 which are threaded through the wall of the chamber 14. By adjusting these screws inwardly or outwardly, the distance between the extremity of the vane 33 and the wall can be varied to allow the desired amounts of air to escape around the extremity of the vane so as to obtain the proper indications on the dial for all given speeds. The normal path of the extremity of vane is indicated in broken line at a, Fig. 4. The screws 38 have dove-tailed or flanged extremities 39 at their points of attachment with the wall member 36 so that they can exert either a pushing or pulling action on the wall member to give the latter any desired contour at any point. The dove-tailed heads are preferably mounted in slightly slotted openings 41 to allow longitudinal shifting of the wall member as it is adjusted.

Since the wall member 36 must be freely movable, and since the screws 38 are rotatably mounted therein, the wall does not form an air-tight barrier. Therefore, air pressure on the inside of the wall 36 can leak or escape to the outside thereof.

A minute adjustment throughout the entire travel of the vane has been found to be necessary in a delicate mechanism of this type. The adjustment at different positions on the dial is not uniform in any one instrument, and the positions in differing instruments have been found to be entirely different, probably due to imperfections, slight roughness in the casting and turning, etc. and to unexpected eddy currents developed in the instrument. With the above arrangement, however, every instrument can be accurately adjusted for all speeds, and when once adjusted, will be permanently accurate at all speeds.

Holes 40 are provided in the outer housing 10 to allow access to the screws 38. Holes are also provided as indicated at 42 in the wall of the chamber 14 to allow the air which escapes past the wall member 36 to exit from the cavity 14 without interference.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An air speed indicator comprising: a substantially circular chamber; an indicator shaft passing axially through said chamber; a partition member extending inwardly from the wall of said chamber to a position adjacent said shaft; a vane mounted on said shaft and adapted to rotate within said chamber; means for admitting air under pressure to one side of said partition member; a flexible wall member positioned on a spiral about the axis of said shaft between the extremity of said vane and the periphery of said chamber; and means for varying the radial position of any given portion of said wall member throughout its length without affecting the radial position of the remainder thereof.

2. An air speed indicator comprising: a substantially circular chamber; an indicator shaft passing axially through said chamber; a partition member extending inwardly from the wall of said chamber to a position adjacent said shaft; a vane mounted on said shaft and adapted to rotate within said chamber; means for admitting air under pressure to one side of said partition member; a spirally arranged flexible wall member positioned between the extremity of said vane and the periphery of said chamber and extending from one face of said partition member to the opposite face thereof; and a plurality of adjusting screws extending through the wall of said chamber into contact with said wall member throughout its length to adjust and fix the radial position of any portion of the latter.

3. An air speed indicator comprising: a substantially circular chamber; an indicator shaft passing axially through said chamber; a partition member extending inwardly from the wall of said chamber to a position adjacent said shaft; a vane mounted on said shaft and adapted to rotate within said chamber; means for admitting air under pressure to one side of said partition member; a flexible wall member spiralling about the axis of said shaft and positioned between the extremity of said vane and the periphery of said chamber and having its extremities positioned on opposite sides of said partition member, means for securing said wall member to said chamber adjacent said partition member at its one extremity; and adjusting screws extending radially inward through the wall of said chamber into contact with said wall member at spaced-apart points throughout its length to fix its radial position at any given point.

4. An air speed indicator comprising: a circular chamber; an indicator shaft passing axially through said chamber; a partition member extending inwardly from the wall of said chamber to a position adjacent said shaft; a vane mounted on said shaft and adapted to rotate within said chamber; means for admitting air under pressure to one side of said partition member; a substantially circular, flexible inner wall in said chamber; and means operable from the exterior of said chamber for adjusting the position of said wall at any desired point on its periphery.

EUGENE M. ARDELT.